United States Patent [19]

Rieck et al.

[11] 4,335,085

[45] Jun. 15, 1982

[54] PROCESS FOR THE PREPARATION OF PHOSPHORUS PENTACHLORIDE

[75] Inventors: Hans-Peter Rieck; Jürgen Russow, both of Kelkheim, Fed. Rep. of Germany

[73] Assignee: Hoechst Aktiengesellschaft, Frankfurt am Main, Fed. Rep. of Germany

[21] Appl. No.: 239,455

[22] Filed: Mar. 2, 1981

[30] Foreign Application Priority Data

Mar. 4, 1980 [DE] Fed. Rep. of Germany ....... 3008194

[51] Int. Cl.³ .............................................. C01B 25/10
[52] U.S. Cl. ..................................................... 423/300
[58] Field of Search ................................. 423/299, 300

[56] References Cited

U.S. PATENT DOCUMENTS 1,906,440  5/1933  Wirth ................................... 423/300
1,914,750  6/1933  Marsh .................................. 423/300
3,995,013  11/1976 Demarq ............................... 423/300
4,265,865  5/1981  Munster et al. ..................... 423/300

FOREIGN PATENT DOCUMENTS 2461905  8/1976  Fed. Rep. of Germany.

OTHER PUBLICATIONS

Ullman, Enzyklopadie der technischen Chemie (Encyclopedia of Industrial Chemistry) 3rd Ed., vol. 13, p. 563.
Kirk-Othmer 2nd Ed., vol. 15, p. 307.

*Primary Examiner*—O. R. Vertiz
*Assistant Examiner*—Gregory A. Heller
*Attorney, Agent, or Firm*—Curtis, Morris & Safford

[57] ABSTRACT

The invention relates to a process for the preparation of highly pure phosphorus pentachloride in the form of a free-flowing crystalline powder by reaction of phosphorus trichloride with chlorine. The reaction is carried out in two stages. In the first stage, phosphorus trichloride is combined with 0.1 to 0.999 times the molar amount of chlorine at a temperature of 0° to 150° C., while stirring, and is thereby reacted to give a crystal sludge comprising phosphorus pentachloride and phosphorus trichloride. In the second stage, this sludge is allowed to react with an excess of chlorine at 0° to 150° C. to give phosphorus pentachloride.

17 Claims, 1 Drawing Figure

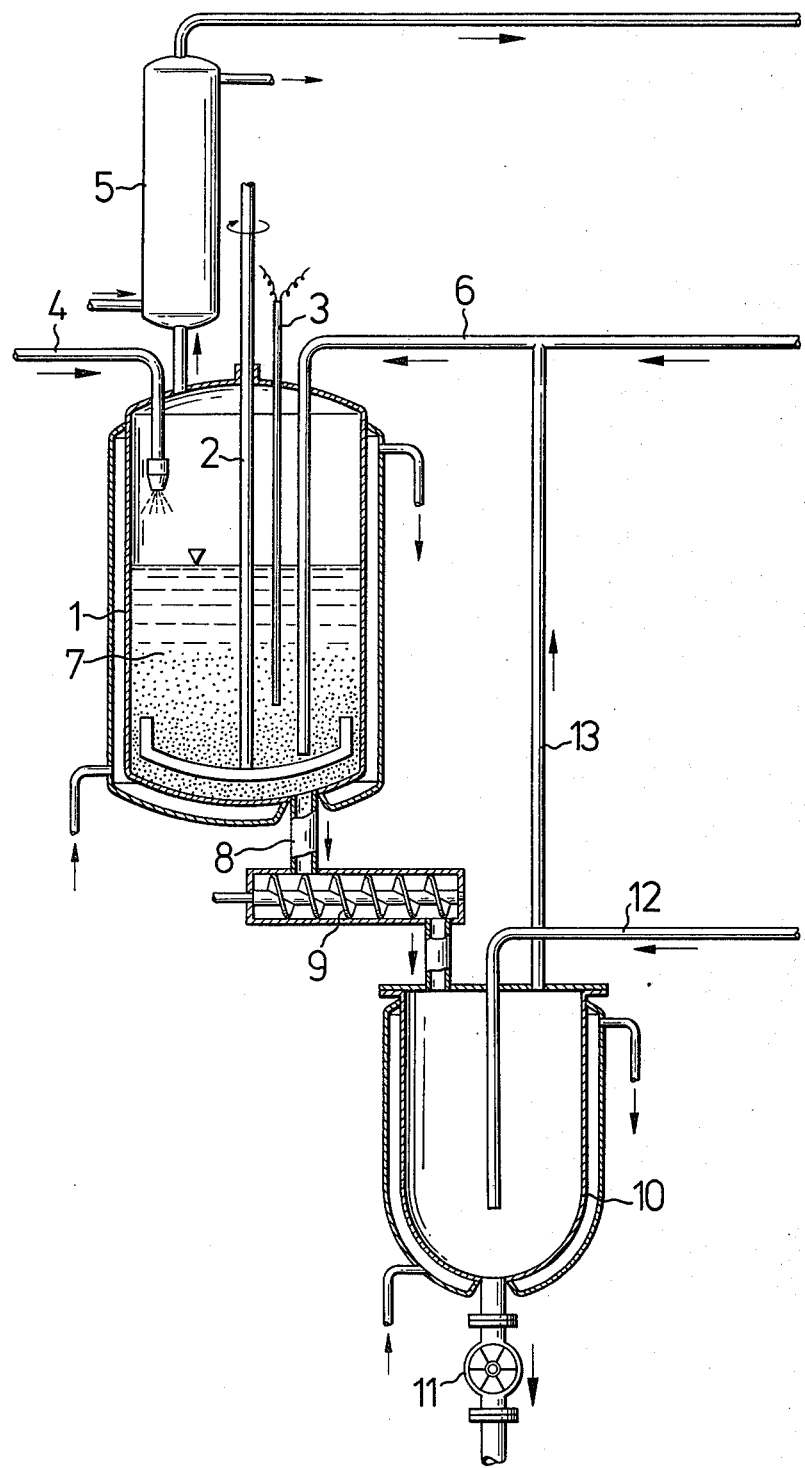

PROCESS FOR THE PREPARATION OF PHOSPHORUS PENTACHLORIDE

The invention relates to a process for the preparation of highly pure phosphorus pentachloride in the form of a free-flowing crystalline powder by reaction of phosphorus trichloride with chlorine.

Phosphorus pentachloride can be prepared from phosphorus trichloride and chlorine discontinuously or continuously, with or without a solvent, by known processes.

In a continuous process described in Kirk-Othmer (2nd Edition, Volume 15, page 307), long reaction towers are used which are lined with lead and in which the phosphorus trichloride metered in falls down in droplets from the top, and is converted into phosphorus pentachloride by contact with chlorine flowing upwards. The phosphorus pentachloride collects as a solid mass on the bottom of the vessel and can be discharged through screws.

The reaction of liquid chlorine with phosphorus trichloride under pressure is described in U.S. Pat. No. 1,914,750. In another process, phosphorus pentachloride is formed when finely divided phosphorus trichloride is introduced into a chlorine atmosphere. The disadvantage of this process is that the heat of reaction can be removed only with great difficulty, and the pentachloride is obtained partly in the form of a dust. On the contrary, a crystalline and free-flowing product is desired.

Carbon tetrachloride is usually employed as the solvent for the reaction of phosphorus trichloride and chlorine (Kirk-Othmer). However, phosphorus oxychloride can also be used (U.S. Pat. No. 1,906,440). It is difficult to remove last residues of solvent in these processes, since $PCl_5$ readily sublimes.

According to a process described in Ullmann (Enzyklopädie der technischen Chemie (Encyclopedia of Industrial Chemistry), 3rd Edition, Volume 13, page 563), phosphorus pentachloride is prepared discontinuously by passing chlorine into initially introduced phosphorus trichloride. In this process, the heat of reaction is removed by external cooling and by the vaporizing trichloride. Solid pentachloride precipitates out of the liquid phase, so that solid pentachloride containing small amounts of trichloride is present at the end of the reaction.

A three-stage process for the preparation of phosphorus pentachloride has also been disclosed (German Auslegeschrift No. 2,461,905). In this process, phosphorus trichloride is first reacted with a substoichiometric amount of chlorine. After cooling, a crystal sludge comprising phosphorus pentachloride crystals and phosphorus trichloride is obtained (stage 1). The crystals are separated off from the liquid phosphorus trichloride phase in an additional step (stage 2), and finally are freed from the last traces of phosphorus trichloride (stage 3). A disadvantage of this process is that the pentachloride formed must be separated off from the trichloride phase in a troublesome reaction step.

There was thus the object of discovering a process which does not have the disadvantages of the known processes and can be carried out simply and continuously.

A two-stage process which fulfils these conditions has now been found. This process gives highly pure phosphorus pentachloride in the form of a free-flowing crystalline powder by reaction of phosphorus trichloride with chlorine. It comprises carrying out the reaction in two stages, phosphorus trichloride being combined with 0.1 to 0.999 times the molar amount of chlorine in the first stage at a temperature of 0°–150° C., while stirring, 0–90% of the phosphorus trichloride added being distilled off and thereby being converted into a crystal sludge comprising 50–99.9 mole % of phosphorus pentachloride (remainder: $PCl_3$), and this sludge being reacted with an excess of chlorine in the second stage at 0°–150° C. to give phosphorus pentachloride.

The $PCl_3$ may be employed in the form of a mixture with $PCl_5$.

The $PCl_3$ can be distilled off after the reaction with chlorine, but in particular during the reaction with chlorine. The quantity of heat liberated during crystallization of $PCl_5$ and during the chlorination can in this way be removed in a simple manner. The amount of $PCl_3$ to be distilled off depends on the amount of chlorine employed. It is important that a crystal sludge of $PCl_3$ and $PCl_5$ containing 50–99.9 mole %, preferably 70–99 mole %, of $PCl_5$ is obtained in the first stage.

If 0.5 to 0.999 times the amount of chlorine (relative to the $PCl_3$ present) is added, it is no longer necessary to remove $PCl_3$ by distillation, but boiling under reflux is sufficient. It may also be advantageous to distill off $PCl_3$ in order to remove traces of $POCl_3$ present.

The second stage is preferably effected outside the vessel in which the formation of the crystal sludge takes place, or inside the vessel, close to the point where the product is to be discharged, or (in the case of a discontinuous procedure) inside the vessel, in order to complete the overall reaction.

Reaction temperatures of 75° to 140° C., especially of 75° to 90° C., are preferred in the first stage, and reaction temperatures of 30° to 100° C. are preferred in the second stage. Both stages can be performed under a pressure of from 0.1 to 10, preferably 0.5 to 1.5 bars. Chlorine may be added in the liquid or gaseous state.

Preferably, in order to avoid a gas phase reaction, the chlorine is passed into the crystal sludge, while the phosphorus trichloride is introduced onto the mixture of $PCl_3/PCl_5$ from the top, for example by being sprayed on. It is thereby ensured that the chlorination predominantly takes place within the reaction mixture; no chlorine escapes into the gas phase in the first stage and the formation of crystals of phosphorus pentachloride is good.

It is also possible to introduce the phosphorus trichloride into the crystal sludge, that is below the surface.

The first and second stages can be carried out in the same reaction container or in two different containers (continuously or discontinuously).

The reaction can also proceed at 0° C.

At temperatures above 140° C., there is the danger that the mixture of phosphorus pentachloride and phosphorus trichloride starts to melt and solidifies again at a lower temperature with the formation of coarse lumps. It is generally true that the reaction temperature may be higher in the case of a high phosphorus pentachloride content than in the case of a lower content. The heat of reaction can be removed by external cooling. Moreover, the evaporative cooling of the phosphorus trichloride makes an additional contribution to the cooling. It may be very advantageous for some of the phosphorus trichloride added to be distilled off. The amount of $PCl_3$ removed in this way can be up to 75%—or from time to time up to 90%—of the amount added.

In the second reaction stage, the reaction mixture, which is rich in phosphorus pentachloride, is reacted with an excess of chlorine without further addition of phosphorus trichloride. This second stage can be carried out with stirring and simultaneous external cooling, which is particularly advantageous in the case of a relatively high phosphorus trichloride content. However, if the reaction mixture consists almost completely of phosphorus pentachloride (95 to 99.9 mole %), the second stage can also be carried out by a procedure in which the crystals of the first stage trickle into a container charged with a chlorine atmosphere.

The (sludge-like or sand-like) reaction mixture from the first stage can be conveyed to the second stage continuously by means of a discharging device, in particular a screw. Other conveying means, for example the force of gravity, can also be used. It is also possible to carry out the chlorination of the second stage already in the discharging device of the first stage. This is particularly advantageous if only very little phosporus trichloride is still present in the reaction mixture. After the chlorination in the second reaction stage, the phosphorus pentachloride can be removed discontinuously or continuously. Excess chlorine can be removed by evacuation or by bubbling out with dried nitrogen and can be recycled to the first reaction stage.

In general, a molar ratio of $PCl_3:Cl_2$ of 1:0.1 to 1:2 and especially of 1:0.2 to 1:0.999 is to be maintained during the addition of chlorine and phosphorus trichloride to the mixture of phosphorus trichloride and phosphorus pentachloride initially introduced in the first stage. It is advantageous if this ratio is within the given limits for each interval of time of 60 minutes, that is to say exclusively one reactant is not added over a longer period.

The amount of $PCl_3$ to be added depends, above all, on the amount which is withdrawn from the reaction by distillation during the reaction. By determining the amounts of $PCl_3$ and chlorine added and $PCl_3$ distilled off, it may be ensured, in a simple manner, that the $PCl_5$ content in the $PCl_5/PCl_3$ crystal sludge is at least 50 mole %, but preferably 75-99 mole %.

It is particularly preferable that the phosphorus trichloride and chlorine be added simultaneously and continuously.

In a particular embodiment of the invention, the first and second reaction stages are carried out in the same reaction vessel. This is a continuous process for the preparation of highly pure phosphorus pentachloride in the form of a free-flowing crystalline powder by reaction of phosphorus trichloride with chlorine. The process comprises initially introducing a mixture of phosphorus pentachloride and phosphorus trichloride into a stirred reaction container, feeding into this mixture phosphorus trichloride or continuously introducing phosphorus trichloride onto the surface of this mixture and distilling off 0 to 0.9 times this amount of phosphorus trichloride, passing 0.98 to 1.0 moles of chlorine per mole of the continuously added amount of $PCl_3$ which has not been distilled off, into the mixture, the mixture being kept in the temperature range from 0° to 150° C., removing the reaction product close to the point at which chlorine is introduced and additionally passing into the mixture the amount of chlorine obtained in the reaction product removed.

The chlorine discharged is best recycled directly into the reaction container. It is also possible to analyze the chlorine discharged and process it to hypochlorite and to introduce an appropriate amount of fresh chlorine into the reaction container.

In this variant, it is advantageous if the initially introduced mixture has a molar ratio of $PCl_5:PCl_3$ of 1:1 to 999:1, preferably of 2.3:1 to 999:1.

The phosphorus trichloride is introduced preferably onto the surface of the reaction mixture (for example by running in, but preferably by spraying or dropwise addition). The point at which the chlorine is introduced should be deep down in the crystal sludge and should be as close as possible to the point at which the product is discharged.

The reaction batch is best stirred slowly in order to incorporate the phosphorus trichloride. Vertical mixing should as far as possible be avoided. In this procedure, a concentration gradient of phosphorus trichloride which decreases from the surface of the crystal sludge to the point at which the chlorine is introduced is established. While liquid can still be detected on the surface and phosphorus trichloride condenses on the cold walls of the reactor, the crystal sludge has reacted completely at the point at which the chlorine is introduced and is thus dry and can be discharged continuously, for example using a screw.

The concentration gradient for phosphorus trichloride can best be maintained if the reaction container is elongated and the chlorine and phosphorus trichloride are introduced at opposite ends of the reaction container. A tube-shaped reaction container which is arranged vertically and into which chlorine is passed at the bottom is best used.

A discontinuous reaction procedure is also possible. In this form of reaction, the amount of phosphorus pentachloride increases continuously. Shortly before the end of the reaction, a slight excess of chlorine is introduced into the reaction vessel in order to convert the last residues of phosphorus trichloride into phosphorus pentachloride, and the product can then be discharged.

This process comprises initially introducing $PCl_5$ or a mixture of $PCl_5$ and $PCl_3$ in a molar ratio of 1:1 or more into a stirred reaction container, introducing liquid $PCl_3$ onto or below the surface of the $PCl_5$ or of the mixture, passing 0.1 to 0.999 mole of chlorine per mole of $PCl_3$ into the mixture and distilling off 0 to 0.9 times the amount of phosphorus trichloride added. It is necessary that a molar ratio of $PCl_5:PCl_3$ of at least 1:1 is maintained in the reaction container during the reaction. When the level to which the reaction container is filled has reached a given height, the addition of $PCl_3$ is ended and an excess amount of chlorine is passed into the reaction mixture. The reaction temperature should be from 0° to 150° C., preferably from 65° to 120° C.

EXAMPLE 1

440 g (2.11 moles) of phosphorus pentachloride and 29.0 (0.211 mole) of phosphorus trichloride are introduced into a 1 l double-walled vessel with an anchor stirrer, reflux condenser, dropping funnel, gas inlet, thermocouple and bottom outlet, to which a screw in connected, under a blanket of nitrogen. The thermocouple and the gas inlet tube are immersed deeply in the crystal sludge. The double-walled vessel and reflux condenser are cooled with water (19° C.). The outlet of the screw is connected to a second vessel, which is provided with an anchor stirrer, gas inlet tube and a line for blanketing with nitrogen. This second reaction vessel is cooled by the surrounding air.

207 g (1.51 moles) of phosphorus trichloride are added dropwise to the double-walled vessel in the course of 35 minutes, while stirring. At the same time, 96.4 g (1.36 moles) of chlorine are passed into the crystal sludge. The reaction temperature rises to 130° C. in the course of a few minutes and is then kept at this temperature by cooling. The crystal sludge is moist on the surface condensation of the phosphorus trichloride is observed on the cold reactor wall and the product is almost dry at the inlet tube for chlorine. The product is discharged continuously with the screw into the second reaction vessel. A chlorine atmosphere is maintained in this vessel. The residual phosphorus trichloride present in the crystal sludge reacts with the chlorine immediately after leaving the screw and trickles into the second reaction vessel, where it is cooled, while stirring, by the air surrounding the vessel. 794 g (3.81 moles) of free-flowing, crystalline white to light-yellow phosphorus pentachloride are obtained. No caking of the product is observed.

EXAMPLE 2

The experimental apparatus approximately corresponds to that in Example 1, but the second reaction vessel (receiver) contains no gas inlet tube and no stirrer.

The apparatus is shown in the FIGURE. The double-walled vessel (1) contains the anchor stirrer (2), the thermocouple (3), the feed line for $PCl_3$ (4) and the reflux condenser (5).

444 g (2.13 moles) of phosphorus pentachloride and 14.6 g (0.106 mole) of phosphorus trichloride and introduced into the double-walled vessel (1). 221.5 g (1.613 moles) of phosphorus trichloride are added dropwise via line (4) in the course of 19 minutes, and, at the same time, 114.4 g (1.613 moles) of chlorine are introduced into the mixture (7) of $PCl_5/PCl_3$ through line (6). During this procedure, the reaction temperature rises rapidly from room temperature to 105° C. and remains between 105° and 112° C. until the reaction has ended. During the reaction, product is simultaneously discharged from the bottom of the double-walled vessel via line (8) by means of screw (9), so that the level to which the double-walled vessel is filled remains constant. Dry product trickles from (9) into the receiver (10), which likewise has a jacket for water cooling, and the chlorine also discharged leads to a green coloration of the gas space in (10). The product is removed through the bucket wheel lock (11).

Nitrogen is forced slowly into the receiver (10) through line (12), and leaves (10) again via line (13). Line (13) joins line (6) for chlorine. The nitrogen, which does not react, leaves the system via the reflux condenser (5), while the chlorine reacts completely in (7). A slight condensation of phosphorus trichloride can be observed on the cooled jacket surface of (1). While the surface of the crystal sludge (7) in vessel (1) is somewhat moist, the product close to the chlorine inlet tube (6) and to the product discharge (8) is completely dry.

During the addition of phosphorus trichloride and chlorine, 335.9 g (1.613 moles) of phosphorus pentachloride are discharged into the receiver (10). In order to end the reaction, 9 g (0.127 mole) of chlorine are passed into the mixture (7) through line (6). The product is transferred to (10) via (8) and (9).

A total of 800 g (3.84 moles) of free-flowing, crystalline white to light-yellow phosphorus pentachloride are obtained and are freed from chlorine by flushing with nitrogen. The product contains less than 0.1% of phosphorus trichloride and does not cake.

EXAMPLE 3

The experimental apparatus corresponds to that of Example 2.

450 g (2.16 moles) of phosphorus pentachloride and 23.6 g (0.172 mole) of phosphorus trichloride are introduced into the double-walled vessel. 212.5 g (1.547 moles) of phosphorus trichloride are added dropwise via line (4) in the course of 16 minutes, and, at the same time, 109.7 g (1.547 moles) of chlorine are passed into the mixture (7) of $PCl_5/PCl_3$ through line (6). The reaction temperature rises to 126° C. No product is discharged during the reaction, and the level to which the reaction vessel is filled increases as $PCl_3$ and $Cl_2$ are added. In order to end the reaction, 24.4 g (0.344 mole) of chlorine are passed in, and the phosphorus pentachloride is then discharged into the receiver (10) with the screw (9). 798 g (3.38 moles) of phosphorus pentachloride are obtained.

EXAMPLE 4

450 g of $PCl_3$ are initially introduced into a 1 l four-necked flask which has mechanical stirring, a reflux condenser, thermometer and gas inlet, and is provided with external heating and a bottom outlet. The phosphorus trichloride is warmed to 60° C., and 69.1 g of chlorine are then passed in over a period of 30 minutes. The temperature is 62°–83° C. When the introduction of chlorine has ended, the solution is slightly turbid as a result of reprecipitation of $PCl_5$.

Half of the reaction mixture is passed, via a warmed line, into a second reaction vessel, which is provided with mechanical stirring, a distillation bridge, a thermometer and a gas inlet. The vessel is preheated to 100° C. 138 g of chlorine/hour are passed in, until the reaction mixture is a solid crystal sludge. Chlorine is subsequently passed in and, at the same time, $PCl_5/PCl_3$ is metered in. Finally, the reaction is ended by adding chlorine in excess. The temperature in the flask rises to 120° C. 231 g of $PCl_3$ are distilled off which contain a small amount of $PCl_5$. 330 g of phosphorus pentachloride are obtained.

We claim:

1. A process for the preparation of highly pure phosphorus pentachloride in the form of a free-flowing crystalline powder by reaction of phosphorus trichloride with chlorine, which comprises carrying out the reaction in two stages, the first stage including phosphorus trichloride being combined with 0.1 to 0.999 times the molar amount of chlorine at a temperature of 0° to 150° C., while stirring, 0 to 0.9 times the amount of the phosphorus trichloride added being distilled off and the remainder thereby being converted into a $PCl_3/PCl_5$ crystal sludge comprising 50–99.9 mole % of phosphorus pentachloride, and the second stage including this sludge being reacted with an excess of chlorine at 0° to 150° C. to give phosphorus pentachloride.

2. A process as claimed in claim 1, wherein the reaction temperature in the first stage is kept at 75° to 140° C. and the reaction temperature in the second stage is kept at 30° to 100° C.

3. A process as claimed in claim 1, wherein the phosphorus trichloride is employed in the form of a mixture with phosphorus pentachloride.

4. A process as claimed in claim 1, wherein in the second stage the sludge from the first stage is transferred to a second reaction vessel, in which the reaction with excess chlorine takes place.

5. A process as claimed in claim 1, wherein phosphorus trichloride and chlorine are added during the first stage in a manner such that, for each interval of 60 minutes, the molar ratio of added $PCl_3$:chlorine is 1:0.1 to 1:2.

6. A process is claimed in claim 3, wherein the phosphorus trichloride and chlorine are added continuously and simultaneously.

7. A process as claimed in claim 1, wherein in the second stage the sludge is transferred into a second reaction vessel and the sludge is reacted in a chlorine atmosphere which is already present in the second reaction vessel during transfer of the sludge.

8. A process as claimed in claim 4 or 7, wherein the reaction vessel for the second stage is a discharging device for the mixture.

9. A process as claimed in claim 8, wherein the discharging device in which the second stage is carried out is a discharge screw.

10. A continuous process for the preparation of highly pure phosphorus pentachloride in the form of a free-flowing crystalline powder by reaction of phosphorus trichloride with chlorine, which comprises initially introducing a mixture of phosphorus pentachloride and phosphorus trichloride into a stirred reaction container, introducing phosphorus trichloride into the mixture or onto the surface of this mixture and distilling off 0 to 0.9 times this amount of phosphorus trichloride, passing 0.98 to 1.0 mole of chlorine per mole of the continuously added amount of $PCl_3$ which has not been distilled off, into the mixture, the mixture being kept in the temperature range from 0° to 150° C., removing the reaction product close to the point at which chlorine is introduced and additionally passing into the mixture the amount of chlorine contained in the reaction product removed.

11. A process as claimed in claim 10, wherein the initially introduced mixture of phosphorus trichloride and phosphorus pentachloride has a molar ratio of $PCl_5$:$PCl_3$ of 1:1 to 999:1.

12. A process as claimed in claim 11, wherein the reaction container is elongated and the chlorine and phosphorus trichloride are introduced at opposite ends of the reaction container.

13. A process as claimed in claim 12, wherein a tube-shaped reaction container which is arranged vertically is used, and the chlorine is introduced at the bottom of the reaction container.

14. A process as claimed in claim 1, which comprises in the first stage initially introducing $PCl_5$ or a mixture of $PCl_5$ and $PCl_3$ in a molar ratio of 1:1 or more into a stirred reaction container, introducing liquid $PCl_3$ onto or below the surface of the $PCl_5$ or of the mixture, passing 0.1 to 0.999 mole of chlorine per mole of $PCl_3$ into the mixture, distilling off 0 to 0.9 times the amount of phosphorus trichloride added, with the proviso that a molar ratio of $PCl_5$:$PCl_3$ of at least 1:1 is maintained in the reaction container during the reaction, and a reaction temperature of 0° to 150° C. is maintained, and, when the level to which the reaction container is filled has reached a given height, in the second stage ending the addition of $PCl_3$ and passing an excess amount of chlorine into the reaction mixture.

15. A process for the continuous preparation of highly pure phosphorus pentachloride in the form of a free-flowing crystalline powder by reaction of phosphorus trichloride with chlorine, which comprises carrying out the reaction in two containers, phosphorus trichloride being combined in the first container continuously with 0.1 to 0.999 times the molar amount of chlorine in the presence of a crystal sludge consisting of $PCl_3$ and $PCl_5$ containing from 50 to 99,9 mol-% $PCl_5$ at a temperature of 0° to 150° C., while stirring, the chlorine being passed into the crystal sludge, 0 to 0.9 times the amount of the phosphorus trichloride added being distilled off and the remainder thereby being converted into the $PCl_3$/$PCl_5$ cyrstal sludge being present and continuously discharging this sludge into a second container and reacting it there with an excess of chlorine at 0° to 150° C. to give phosphorus pentachloride.

16. The process according to claim 1, wherein the first stage further includes adjusting the amount of phosphorus trichloride and chlorine added and the amount of phosphorus trichloride distilled to maintain the content of phosphorus pentachloride in the sludge at at least 50 mole %.

17. The process according to claim 16, wherein the content of phosphorus pentachloride in the sludge is maintained at 75 to 99 mole %.

* * * * *